(12) United States Patent
Lin et al.

(10) Patent No.: US 8,737,832 B1
(45) Date of Patent: May 27, 2014

(54) FLICKER BAND AUTOMATED DETECTION SYSTEM AND METHOD

(75) Inventors: Shang-Hung Lin, San Jose, CA (US); Hu He, Sunnyvale, CA (US); Ignatius B. Tjandrasuwita, Atherton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 781 days.

(21) Appl. No.: 11/704,507

(22) Filed: Feb. 9, 2007

Related U.S. Application Data (60) Provisional application No. 60/772,437, filed on Feb. 10, 2006.

(51) Int. Cl.
*G03B 7/093* (2006.01)

(52) U.S. Cl.
USPC ............ 396/234; 396/246; 348/226.1

(58) Field of Classification Search
USPC ............ 396/246, 213, 234; 348/226.1
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |
| 5,995,109 A | 11/1999 | Goel et al. |
| 6,016,474 A | 1/2000 | Kim et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS http://Slashdot.org/articles/07/09/06/1431217.html.

(Continued)

*Primary Examiner* — W B Perkey (57) ABSTRACT

A flicker band automated detection system and method are presented. In one embodiment an incidental motion mitigation exposure setting method includes receiving image input information; performing a motion mitigating flicker band automatic detection process; and implementing exposure settings based upon results of the motion mitigating flicker band automatic detection process. The auto flicker band detection process includes performing a motion mitigating process on an illumination intensity indication. Content impacts on an the motion mitigated illumination intensity indication are minimized. The motion mitigated illumination intensity indication is binarized. A correlation of the motion mitigated illumination intensity and a reference illumination intensity frequency is established.

27 Claims, 3 Drawing Sheets

(56) References Cited

U.S. PATENT DOCUMENTS

| | | |
|---|---|---|
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,504,952 B1 | 1/2003 | Takemura et al. |
| 6,584,202 B1 | 6/2003 | Montag et al. |
| 6,594,388 B1 | 7/2003 | Gindele et al. |
| 6,683,643 B1 | 1/2004 | Takayama et al. |
| 6,707,452 B1 | 3/2004 | Veach |
| 6,724,423 B1 | 4/2004 | Sudo |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 * | 4/2006 | Hiramatsu et al. ............ 348/243 |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,146,041 B2 | 12/2006 | Takahashi |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,626,612 B2 | 12/2009 | John et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,817,187 B2 | 10/2010 | Silsby et al. |
| 7,859,568 B2 | 12/2010 | Shimano et al. |
| 7,860,382 B2 | 12/2010 | Grip |
| 7,912,279 B2 | 3/2011 | Hsu et al. |
| 8,049,789 B2 | 11/2011 | Innocent |
| 8,238,695 B1 | 8/2012 | Davey et al. |
| 8,456,547 B2 | 6/2013 | Wloka |
| 8,456,548 B2 | 6/2013 | Wloka |
| 8,456,549 B2 | 6/2013 | Wloka |
| 8,471,852 B1 | 6/2013 | Bunnell |
| 8,570,634 B2 | 10/2013 | Luebke et al. |
| 8,571,346 B2 | 10/2013 | Lin |
| 8,588,542 B1 | 11/2013 | Takemoto et al. |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 * | 10/2002 | Daiku et al. ............... 348/226.1 |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0218672 A1 | 11/2003 | Zhang et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0111110 A1 | 5/2005 | Matama |
| 2005/0175257 A1 | 8/2005 | Kuroki |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0119710 A1 | 6/2006 | Ben-Ezra et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0285530 A1 | 12/2007 | Kim et al. |
| 2008/0030587 A1 | 2/2008 | Helbing |
| 2008/0043024 A1 | 2/2008 | Schiwietz et al. |
| 2008/0062164 A1 | 3/2008 | Bassi et al. |
| 2008/0101690 A1 | 5/2008 | Hsu et al. |
| 2008/0143844 A1 | 6/2008 | Innocent |
| 2008/0231726 A1 | 9/2008 | John |
| 2009/0002517 A1 | 1/2009 | Yokomitsu et al. |
| 2009/0010539 A1 | 1/2009 | Guarnera et al. |
| 2009/0037774 A1 | 2/2009 | Rideout et al. |

(56) References Cited

U.S. PATENT DOCUMENTS

| | | | |
|---|---|---|---|
| 2009/0116750 | A1 | 5/2009 | Lee et al. |
| 2009/0128575 | A1 | 5/2009 | Liao et al. |
| 2009/0160957 | A1 | 6/2009 | Deng et al. |
| 2009/0257677 | A1 | 10/2009 | Cabral et al. |
| 2010/0266201 | A1 | 10/2010 | Cabral et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08-079622 | 3/1996 |
| JP | 2000516752 | 12/2000 |
| JP | 2001052194 | 2/2001 |
| JP | 2002-207242 | 7/2002 |
| JP | 2003-085542 | 3/2003 |
| JP | 2004-221838 | 8/2004 |
| JP | 2004221838 | 8/2004 |
| JP | 2005094048 | 4/2005 |
| JP | 2005-182785 | 7/2005 |
| JP | 2005520442 | 7/2005 |
| JP | 2006025005 | 1/2006 |
| JP | 2006086822 | 3/2006 |
| JP | 2006-094494 | 4/2006 |
| JP | 2006121612 | 5/2006 |
| JP | 2006134157 | 5/2006 |
| JP | 2007019959 | 1/2007 |
| JP | 2007-148500 | 6/2007 |
| JP | 2009021962 | 7/2007 |
| JP | 2007-233833 | 9/2007 |
| JP | 2007282158 | 10/2007 |
| JP | 2008085388 | 4/2008 |
| JP | 2008113416 | 5/2008 |
| JP | 2008277926 | 11/2008 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS http:englishrussia.com/?p=1377.

"A Pipelined Architecture for Real-Time Correction of Barrel Distortion in Wide-Angle Camera Images", Hau, T. Ngo, Student Member, IEEE and Vijayan K. Asari, Senior Member IEEE, IEEE Transaction on Circuits and Systems for Video Technology: vol. 15 No. 3 Mar. 2005 pp. 436-444.

"Calibration and removal of lateral chromatic aberration in images" Mallon, et al. Science Direct Copyright 2006; 11 pages.

"Method of Color Interpolation in a Single Sensor Color Camera Using Green Channel Seperation" Weerasighe, et al Visual Information Processing Lab, Motorola Austrailan Research Center pp. IV-3233-IV3236, 2002.

D. Doo, M. Sabin "Behaviour of recrusive division surfaces near extraordinary points"; Sep. 1978; Computer Aided Design; vol. 10, pp. 356-360.

D. W. H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

E. Catmull, J. Clark, "recursively generated B-Spline surfaces on arbitrary topological meshes"; Nov. 1978; Computer aided design; vol. 10; pp. 350-355.

J. Bolz, P. Schroder; "rapid evaluation of catmull-clark subdivision surfaces"; Web 3D '02, 2002.

J. Stam; "Exact Evaluation of Catmull-clark subdivision surfaces at arbitrary parameter values"; Jul. 1998; Computer Graphics; vol. 32; pp. 395-404.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at chapel Hill, Technical Report, pp. 1-36.

Kuno et al. "New Interpolation Method Using Discriminated Color Correlation for Digital Still Cameras" IEEE Transac. On Consumer Electronics, vol. 45, No. 1, Feb. 1999, pp. 259-267.

Loop, C., DeRose, T., Generalized B-Spline surfaces of arbitrary topology, Aug. 1990, SIGRAPH 90, pp. 347-356.

M. Halstead, M. Kass, T. DeRose; "efficient, fair interpolation using catmull-clark surfaces"; Sep. 1993; Computer Graphics and Interactive Techniques, Proc; pp. 35-44.

T. DeRose, M., Kass, T. Troung; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.

Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

gDEBugger, graphicRemedy, http://www.gremedy.com, Aug. 8, 2006, pp. 1-18.

http://en.wikipedia.org/wiki/Bayer_filter; "Bayer Filter"; Wikipedia, the free encyclopedia; pp. 1-4.

http://en.wikipedia.org/wiki/Color_filter_array; "Color Filter Array"; Wikipedia, the free encyclopedia; pp. 1-5.

http://en.wikipedia.org/wiki/Color_space; "Color Space"; Wikipedia, the free encyclopedia; pp. 1-4.

http://en.wikipedia.org/wiki/Color_translation; "Color Management"; Wikipedia, the free encyclopedia; pp. 1-4.

http://en.wikipedia.org/wiki/Demosaicing; "Demosaicing"; Wikipedia, the free encyclopedia; pp. 1-5.

http://en.wikipedia.org/wiki/Half_tone; "Halftone", Wikipedia, the free encyclopedia; pp. 1-5.

http://en.wikipedia.org/wiki/L*a*b*; "Lab Color Space"; Wikipedia, the free encyclopedia; pp. 1-4.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

(56) References Cited

OTHER PUBLICATIONS

S. Erturk, "Real-Time Digital Image Stabilization Using Kalman Filters", http://www,ideallibrary.com, Real-Time Imaging 8, pp. 317-328, 2002.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and VCRS", J. Soc. Motion Pict. Telev. Eng., vol. 101, pp. 66-75, 1992.

Weerasinghe et al.; "Method of Color Interpolation in a Single Sensor Color Camera Using Green Channel Separation"; Visual Information Proessing lab, Motorola Australian Research Center; IV 3233-IV3236.

* cited by examiner

FLICKER BAND AUTOMATED DETECTION SYSTEM AND METHOD

RELATED APPLICATIONS

This application claims the benefit of and priority filing date of provisional application 60/772,437 entitled "A Flicker Band Automated Detection System and Method" filed Feb. 10, 2006, which is incorporated herein by this reference.

FIELD OF THE INVENTION

The present invention relates to the field of digital cameras. More particularly the present invention relates to a flicker band automated detection system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. For example, digital cameras have had a significant impact on the field of photography and usually offer a number of features that enhance image quality. Nevertheless, there are several phenomena such as flicker or running bands in an image frame that can adversely impact results. Setting a rolling shutter time to a multiple of a corresponding illumination variation (e.g., $1/100$ seconds or $1/120$ seconds) often mitigates adverse impacts associated with the flicker bands. However, determining the illumination variance frequency is usually very difficult and often susceptible to a number of inaccuracies.

A rolling shutter approach is often utilized by a variety of devices (e.g., a CMOS imagers) to control the optical integration time. Rolling shutter approaches typically enable an equal optical integration time to be achieved for pixels in an image frame however this optical integration does not typically happen for all pixels simultaneously. The actual interval used for integration is usually dependent on the vertical position of the pixel in an image frame. Rolling shutter approaches typically utilize at least two pointers, a reset pointer and a read pointer, to define shutter width. Shutter width is the number of lines ("distance") between the two pointers. These pointers continuously move through the pixel array image frame from top to bottom, jumping from line to line at timed intervals. The reset pointer typically starts the integration for pixels in a line, and subsequently, the read pointer reaches the same line and initiates signal readout. Shutter width multiplied by the line time gives the duration of the optical integration time. If the illumination intensity of the light source does not remain constant over time, rolling shutter methods of integration time control can lead to the possibility of flicker or "running bands" in the image frame.

Flicker band issues are typically caused by scene illumination sources with varying light intensity. For example, illumination intensity usually fluctuates in light sources driven by alternating current (AC) supply power. The light intensity of AC powered light sources (e.g., fluorescent lamps) usually is enveloped by a 100 Hz or 120 Hz wave if the power source is operating at 50 Hz or 60 Hz correspondingly. If the video rate is 15 frames per second, there could be six (50 Hz power) or eight (60 Hz power) flicker dark bands overlying the preview image.

Determining the illumination variance frequency is traditionally resource intensive and difficult. A straightforward frequency transform (e.g., FFT) of the image frame consumes significant amounts of computation resources and the results can be relatively easily corrupted by the image content. Some traditional attempts at detecting mismatches between the frequency of an illumination source and the duration of optical integration time for an imager with rolling shutter involve detecting a sine image fluctuation in the difference of the two consecutive image frames. However, these approaches are often limited by averages from a single line or row of an image. In addition, a slight vertical shift in the camera such as the shaking hand of a photographer, could greatly deteriorate the results. Relatively low confidence levels associated with these traditional approaches are exacerbated by the utilization of zero crossing point estimation of flicker wave periods.

SUMMARY

A flicker band automated detection system and method are presented. In one embodiment an incidental motion mitigation exposure setting method includes receiving image input information; performing a motion mitigating flicker band automatic detection process; and implementing exposure settings based upon results of the motion mitigating flicker band automatic detection process. The motion mitigating flicker band automatic detection process includes performing a motion mitigating process on an illumination intensity indication. Content impacts on the motion mitigated illumination intensity indication are minimized. The motion mitigated illumination intensity indication is binarized. A correlation of the motion mitigated illumination intensity and a reference illumination intensity frequency is established.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions, which follow, are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Figure 1:
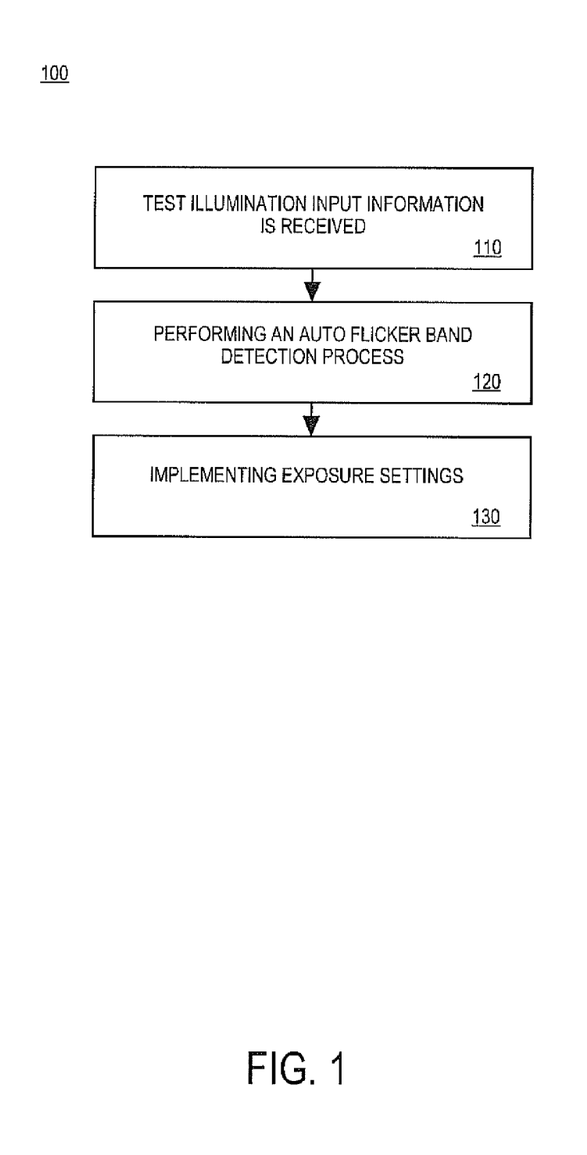
FIG. 1 is a flow chart of an exemplary incidental motion mitigation exposure setting method in accordance with one embodiment of the present invention.

FIG. 1 is a flow chart of incidental motion mitigation exposure setting method 100 in accordance with one embodiment of the present invention.

In step 100, test illumination input information is received. The test illumination information can be initial illumination information sensed by a digital imager. The information can be received from a variety of digital imagers. In one embodiment the image input information is received from a CMOS imager. The auto exposure (AE) is set to a predetermined reference illumination frequency for capturing the initial image test input information. In one exemplary implementation, initial sensor timing for the received initial test input information is set so that frame height is not a multiple of the inverse of twice the reference illumination frequency. For example, if an auto exposure (AE) reference illumination frequency is initially set at the reference illumination frequency of 50 Hz the sensor timing frame is set up so that the frame height is not a multiple of 1/100 seconds. This ensures that the location of flicker bands will move from frame to frame if the flicker bands exist.

In step 120, a motion mitigating flicker band automatic detection process is performed. The motion mitigating flicker band automatic detection process automatically identifies an illumination frequency. In one embodiment, the motion mitigating flicker band automatic detection process provides a confidence level by utilizing correlation scores to a know reference frequency. Down-sampled averages are utilized in the determination of the correlation score to minimize adverse impacts of incidental motion or jitters in hand movements while capturing the image. Additional explanation and implementations of motion mitigating flicker band automatic detection processes is presented below.

In step 130, exposure settings are implemented. The exposure settings are implemented based upon said identified illumination frequency. In one embodiment of the present invention, a digital camera exposure reset from an initial exposure setting to an exposure based upon the identified illumination frequency is executed. In one exemplary implementation, auto exposure controls are utilized to switch between exposure tables (e.g., a 50 Hz exposure table or a 60 Hz exposure table).

Figure 2:
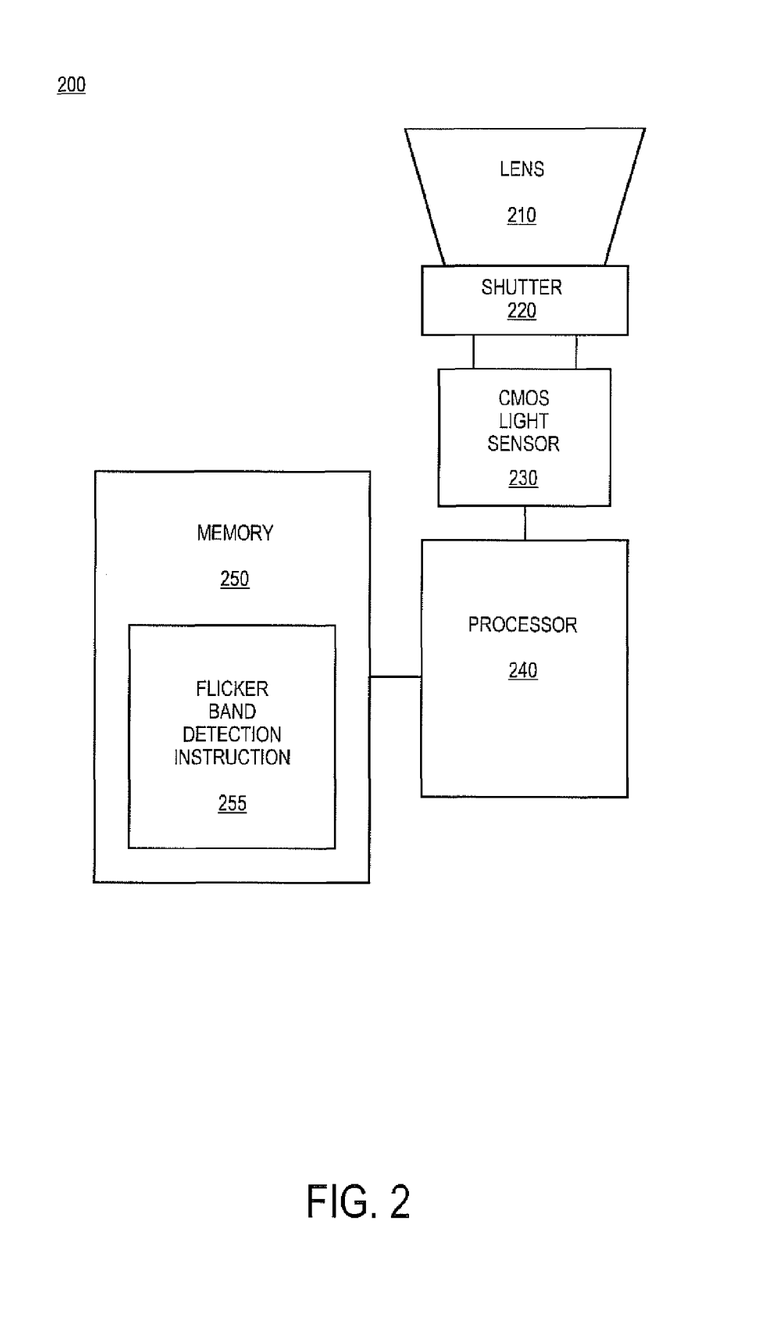
FIG. 2 is a block diagram of an exemplary automated flicker band compensation imaging system in accordance with one embodiment of the present invention.

FIG. 2 is a block diagram of automated flicker band compensation imaging system 200 in accordance with one embodiment of the present invention. Automated flicker band compensation imaging system 200 includes lens 210, shutter 220, light sensor 230, processor 240 and memory 250. Lens 210 is coupled to shutter 220 which is coupled to light sensor 230 which in turn is coupled to processor 240. Processor 240 is coupled to shutter 220 and memory 250 which includes flicker band automatic detection instructions 255.

The components of automated flicker band compensation imaging system 200 cooperatively operate to automatically detect and minimize flicker band effects while capturing digital images. Lens 210 focuses light reflected from an object onto light sensor 230. Light sensor 230 senses light from lens 210 and converts the light into electrical digital image information. In one embodiment of the present invention, light sensor 230 is a complementary metal oxide silicon (CMOS) light sensor. Shutter 210 controls the length of time light is permitted to pass from lens 210 to light sensor 230. Light sensor 230 forwards the digital image information to processor 240 for processing. Processor 240 performs digital image information processing including automated flicker band detection and mitigation. Memory 250 stores digital image information and instructions for directing processor 240, including flicker band detection instructions 255 for performing automated flicker band detection and mitigation. In one embodiment, a subtraction buffer included in the processor 240 stores content neutralized illumination intensity values utilized by the processor. In an alternate embodiment, the subtraction buffer is included in memory 250.

Figure 3:
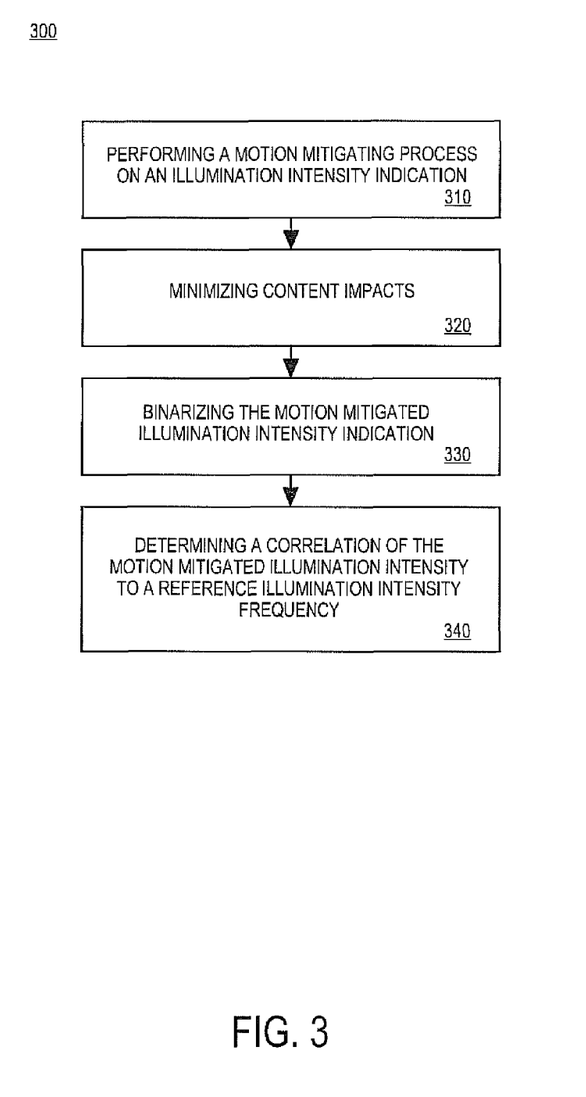
FIG. 3 is a flow chart of an exemplary auto flicker band detection process 300 in accordance with one embodiment of the present invention.

FIG. 3 is a flow chart of auto flicker band detection process 300 in accordance with one embodiment of the present invention.

In step 310, a motion mitigating process is performed on an illumination intensity indication. In one embodiment, the motion mitigation process includes performing image down-sampling and averaging illumination intensity values from a plurality of pixel rows of the resulting sub-sampled image. In one exemplary implementation, the number of downsampled pixel rows is maintained above a minimum that is greater than the video frame rate. In one embodiment reliable down-sampled pixels are selected for the averaging, wherein the reliable down-sampled pixels include pixels associated with a smooth well lit surface.

In step 320, content impacts are minimized on the motion mitigated illumination intensity indication. In one embodiment, minimizing content impacts on the illumination intensity indication includes subtracting illumination intensity values of a first frame from illumination intensity values of a second frame. In one exemplary implementation, the current frame column buffer is subtracted from the previous frame column buffer. The subtraction results are stored in a new buffer referred to as the subtraction buffer. In one exemplary implementation, a periodic waveform is included in the entries of the subtraction buffer if there is flicker band problem.

In step 330, the motion mitigated illumination intensity indication is binarized. In one embodiment, binarizing the illumination intensity indication includes comparing each entry value in a subtraction buffer with a moving average value and if a row in the subtraction buffer has a value larger than the mean, the values changes to +1, otherwise it's change to −1. For example if the j-th row in the subtraction buffer has a value larger than the mean, the value is changed to +1, otherwise it's changed to −1.

In step 340, a correlation of the motion mitigated illumination intensity to a reference illumination intensity frequency is determined. In one embodiment a correlation score is utilized to establish the correlation of the motion mitigated illumination intensity to a reference illumination intensity frequency. For example, the correlation score is assigned based upon the following manipulation:

$$\text{score} = \sum_{0 \le k \frac{T}{2} i=1}^{X} S[i]R[i+k]$$

Where S[i] is the brightness indication sequence, R[i+k] is the reference sequence, X is the number of samples, k is the offset and the parameter T is the distance between two flicker bands in the sub sampled image. The unit for the T parameter is the number of rows. Additional confidence is provided by the correlation of the motion mitigated illumination intensity to a reference illumination intensity frequency. The additional confidence level provided by the present invention enables a conscious decision (e.g., a decision that has very low false positive error probability) on the current flickering frequency when the reference frequency is known to be relatively stable. For example the reference frequency is selected to correspond with the power source frequency since the power frequency does not change very often. The present invention correlation score also provides enhanced noise immunity, since one or two earliest entries in the column vector can still produce high correlation results.

The downsampling reduces the influence of incidental movement or camera jitter on determining the illumination intensity frequency. The larger of the down scaling ratio, the more translational invariant that frame subtraction performed for minimizing content impacts in step 320. In one exemplary implementation, the number of downsampled pixel rows is maintained above the minimum. For example, if the video frame rate is 15 frames per second and the luminance frequency is 60 hertz, there will be eight horizontal bands in the image frame. In order to capture the variations of those bands, the number of downsample rows is maintained above It is appreciated that the generation of the column vector from the down sampled image can be implemented in a variety of different ways. In one exemplary implementation, the average of the downsample pixels is taken from multiple entire rows. If the surface is smooth the frame subtraction has a better chance of successfully removing the same content of camera jitter. Therefore the downsample pixels are chosen from a location corresponding to relatively smooth and well lit surface to generate the column vector. In another exemplary implementation simple tracking of the down sampled pixels is performed before the row averaging, so that the influence of the horizontal translation can be reduced.

Thus, the present invention facilitates automated selection of exposure settings with a high degree of confidence and minimal impacts due to jitter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An incidental motion mitigation exposure setting method comprising:
    receiving image input information;
    performing a motion mitigating flicker band automatic detection process, wherein said motion mitigating flicker band automatic detection process includes:
        performing a motion mitigating process on an illumination intensity indication, wherein said motion mitigating process includes image down sampling and averaging pixel intensity readings over a plurality of pixel rows;
        minimizing content impacts on said illumination intensity indication results of said motion mitigating process;
        binarizing said motion mitigated illumination intensity indication; and
        finding a correlation of said motion mitigated illumination intensity and a reference illumination intensity frequency; and
    implementing exposure settings based upon results of said motion mitigating flicker band automatic detection process.

2. The incidental motion mitigation exposure setting method of claim 1 wherein said motion mitigating flicker band automatic detection process automatically identifies an illumination frequency.

3. The incidental motion mitigation exposure setting method of claim 2 wherein said exposure settings are implemented based upon said identified illumination frequency.

4. The incidental motion mitigation exposure setting method of claim 1 wherein said image input information is received from a CMOS imaging apparatus.

5. The incidental motion mitigation exposure setting method of claim 1 further comprising setting up a sensor timing frame that is not a multiple of an illumination intensity reference frequency.

6. The incidental motion mitigation exposure setting method of claim 1 wherein a correlation score is utilized to establish said correlation and said correlation score is assigned based upon the following manipulation:

$$\text{score} = \sum_{0 \le k \frac{T}{2} i=1}^{X} S[i]R[i+k]$$

where S[i] is the brightness indication sequence, R[i+k] is the reference sequence, X is the number of samples, k is the offset and the parameter T is the distance between two flicker bands in the sub sampled image with the unit of number of rows.

7. A flicker band automatic detection imaging system comprising:
   a lens for focusing light reflected from an object;
   a light sensor for sensing light from said lens and converting said light into electrical digital image information;
   a shutter for controlling a length of time said light is permitted to pass from said lens to said light sensor;
   a processor for processing said digital image information forwarded from said light sensor and directing motion mitigated flicker band automatic detection and mitigation, wherein said motion mitigating flicker band automatic detection and mitigation includes:
      performing a motion mitigating process on an illumination intensity indication, wherein said motion mitigating process includes image down sampling and averaging pixel intensity readings over a plurality of pixel rows;
      minimizing content impacts on said illumination intensity indication results of said motion mitigating process;
      binarizing said motion mitigated illumination intensity indication; and
   finding a correlation of said motion mitigated illumination intensity and a reference illumination intensity frequency; and
   a memory for storing digital image information and instructions for directing said processor, including motion mitigated flicker band automatic detection instructions for performing flicker band automatic detection and mitigation.

8. A flicker band automatic detection imaging system of claim 7 wherein said motion mitigating auto flicker band detection process automatically identifies an illumination intensity frequency and establishes a corresponding exposure setting.

9. A flicker band automatic detection imaging system of claim 7 wherein said processor controls said length of time said shutter permits light to pass from said lens to said light sensor based upon said established exposure setting.

10. A flicker band automatic detection imaging system of claim 7 wherein content neutralized illumination intensity values are utilized by said processor.

11. A flicker band automatic detection imaging system of claim 7 wherein said directing motion mitigated flicker band automatic detection identifies an illumination intensity frequency based upon a known reference illumination intensity frequency.

12. A motion mitigating flicker band automatic detection process comprising
   performing a motion mitigating process on an illumination intensity indication;
   minimizing content impacts on an said motion mitigated illumination intensity indication;
   binarizing said motion mitigated illumination intensity indication; and
   finding a correlation of said motion mitigated illumination intensity and a reference illumination intensity frequency.

13. A motion mitigating flicker band automatic detection process of claim 12 wherein said motion mitigation process includes:
   performing image sub-sampling; and
   averaging illumination intensity values from a plurality of pixel rows of said resulting sub-sampled image.

14. A motion mitigating flicker band automatic detection process of claim 12 wherein a number of downsampled pixel rows is maintained above a minimum that is greater than a video frame rate.

15. A motion mitigating flicker band automatic detection process of claim 12 wherein minimizing content impacts on said illumination intensity indication includes subtracting illumination intensity values of a first frame from illumination intensity values of a second frame.

16. A motion mitigating flicker band automatic detection process of claim 12 wherein said correlation score is assigned based upon the following manipulation:

$$\text{score} = \sum_{0 \le k \frac{T}{2}, i=1}^{X} S[i]R[i+k]$$

where S[i] is the brightness indication sequence, R[i+k] is the reference sequence, X is the number of samples, k is the offset and the parameter T is the distance between two flicker bands in the sub sampled image with the unit of number of rows.

17. A motion mitigating flicker band automatic detection process of 13 further comprising selecting reliable down-sampled pixels for said averaging.

18. A motion mitigating flicker band automatic detection process of claim 13 wherein said reliable down-sampled pixels include pixels associated with smooth well lit surface.

19. A motion mitigating flicker band automatic detection process of claim 12 wherein binarizing said illumination intensity indication includes comparing each entry value in a subtraction buffer with a moving average value and if a row in the subtraction buffer as a value larger than the mean the values change to one, otherwise the values change to negative one.

20. An incidental motion mitigation exposure setting method comprising:
   receiving image input information;
   performing a motion mitigating flicker band automatic detection process, wherein said motion mitigating flicker band automatic detection process includes:
      performing a motion mitigating process on an illumination intensity indication;
      minimizing content impacts on said illumination intensity indication results of said motion mitigating process;
      binarizing said motion mitigated illumination intensity indication; and
      finding a correlation of said motion mitigated illumination intensity and a reference illumination intensity frequency; and
   implementing exposure settings based upon results of said motion mitigating flicker band automatic detection process.

21. An incidental motion mitigation exposure setting method of claim 20 wherein said motion mitigation process includes:
   performing image sub-sampling; and
   averaging illumination intensity values from a plurality of pixel rows of said resulting sub-sampled image.

22. An incidental motion mitigation exposure setting method of claim 20 wherein a number of downsampled pixel rows is maintained above a minimum that is greater than a video frame rate.

23. An incidental motion mitigation exposure setting method of claim 20 wherein minimizing content impacts on said illumination intensity indication includes subtracting illumination intensity values of a first frame from illumination intensity values of a second frame.

24. An incidental motion mitigation exposure setting method of claim 20 wherein a correlation score is utilized to establish said correlation and said correlation score is assigned based upon the following manipulation:

$$\text{score} = \sum_{\substack{0 \le k \frac{T}{2} \\ i=1}}^{X} S[i]R[i+k]$$

where S[i] is the brightness indication sequence, R[i+k] is the reference sequence, X is the number of samples, k is the offset and the parameter T is the distance between two flicker bands in the sub sampled image with the unit of number of rows.

25. An incidental motion mitigation exposure setting method of claim 20 further comprising selecting reliable down-sampled pixels for said averaging.

26. An incidental motion mitigation exposure setting method of claim 20 wherein said reliable down-sampled pixels include pixels associated with smooth well lit surface.

27. A incidental motion mitigation exposure setting method of claim 20 wherein subtraction values are equal to subtracting illumination intensity values of a first frame from illumination intensity values of a second frame and binarizing said illumination intensity indication includes comparing said subtraction values with a moving average value and if a row of said subtraction values is larger than the mean the subtraction values change to one, otherwise the subtraction values change to negative one.

* * * * *